United States Patent [19]

[11] 3,942,238

Dore

[45] Mar. 9, 1976

[54] METHOD FOR REINFORCING STRUCTURES

[76] Inventor: Jean Pierre Dore, 159 Debruxlelle, Ontario, Canada

[22] Filed: Apr. 22, 1974

[21] Appl. No.: 462,973

[52] U.S. Cl. .................. 29/433; 29/241; 29/452; 52/230; 254/1

[51] Int. Cl.² .................. B23P 19/04

[58] Field of Search .......... 29/433, 452, 241; 254/1, 254/29 A; 52/230

[56] References Cited

UNITED STATES PATENTS

| | | | |
|---|---|---|---|
| 2,550,898 | 5/1951 | Youngblood et al. | 29/241 |
| 2,958,126 | 11/1960 | Shaw et al. | 29/433 |
| 3,225,499 | 12/1965 | Kourkene | 29/452 X |
| 3,513,532 | 5/1970 | Lambert | 29/433 |
| 3,719,982 | 3/1973 | Tindal | 52/230 X |
| 3,785,617 | 1/1974 | Friedrich | 254/29 A X |

*Primary Examiner*—Charlie T. Moon

*Attorney, Agent, or Firm*—Brumbaugh, Graves, Donohue & Raymond

[57] ABSTRACT

A method of reinforcing structures by means of tensioned steel cables is disclosed. A hollow conduit or duct is positioned in the structure and secured therein and made a part thereof by pouring concrete in a form surrounding the conduit. A specified number of steel strands, wires or cables are inserted and pushed through the conduit one-by-one by a mechanical strand pusher. A nose guide is positioned on the end of each of the strands if required to enable them to pass easily through the conduit. When the required amount of strands are positioned in the conduit and the concrete has set to a predetermined strength, the strands are stressed thereby putting the structure under compression.

10 Claims, 7 Drawing Figures

METHOD FOR REINFORCING STRUCTURES

BACKGROUND OF THE INVENTION

This invention relates to an improved method for installing elements for prestressing structures such as buildings, bridges and formed concrete structures of all types. In general, for the construction of a prestressed structure, tensioning strands are positioned in it during fabrication or construction and the strands subsequently are tensioned. The tensioning can be done before or after the concrete is poured forming the structure. There are numerous factors involved in determining whether a structure is to be built with previously stressed members, or whether the structure is to be stressed on site after fabrication.

When the structure is of a significant size, normally it is stressed at the building site. The size and weight of the parts of the structure prevent them from being prefabricated at a factory and transported to the building site. The structure must be poured and formed in final position and also tensioned in that position.

There are several ways of installing strands in the structure on situs. In one method, a conduit or duct is formed in the structure, normally by the placement of a hollow tube in the supporting frame before the concrete or similar material is poured. Subsequently, the requisite number of strands are pulled out of a supply reel, cut to the desired length, and placed side-by-side on the ground. One end of the group of strands is capped or otherwise rigidly fastened together, such as by welding. A guide wire is forced through the conduit and attached to the group of strands, and the strands are then pulled through the length of the conduit as one unit. Subsequently, the strands are stressed.

Such a method of prestressing, however, is time-consuming and expensive and also necessitates the use of heavy construction equipment and a significant amount of space. Each of the strands forming the bundle has to be taken from a supply reel and laid out straight so that the other cables can be placed next to it. The strands are heavy and sometimes construction equipment is necessary to position all of the cables in a bundle. Where the cables are of significant length, a similar amount of free space is necessary at the construction site for this procedure; such space at some construction projects is extremely limited, however. After the bundle or group of strands is formed, it necessary for a crane or other heavy construction equipment to transport the bundle, position it near the conduit, and assist in inserting it into and through the conduit. Thus, the use of numerous items of construction equipment and a team of construction workers is necessary for such construction projects.

In a second method of installing strands, the strands are prefabricated in a plant with all of the necessary hardware attached to them, such as bearing-plates, anchor-heads and the like. Groups of the strands are inserted in flexible conduits and coiled for delivery to the construction site. The strands are usually inserted in the flexible conduit in the same manner as described above, namely by the use of a guide wire and then by being pulled as a group through the conduit.

At the site, a coiled group of strands is placed on a turn table held by a crane and hoisted onto the structure. The coil is unwound and placed in position at the site. Concrete is then poured around the conduit, and allowed to set before the strands are stressed.

The "turn-table" method also requires the use of heavy construction equipment and a large team of workers. The turn-table is large and is cumbersome to move, position and operate at the construction site.

When the strands or tendons are stressed before concrete is poured forming the structure, it is normally carried out on a casting bed. The strands are pulled from a supply reel, laid out straight on the ground forming a bundle, and placed in position on the casting bed. Other requisite reinforcing steel inserts are then placed on the casting bed, forms are positioned around the work, and the concrete is poured.

Prestressing of the strands before the concrete is poured can only be utilized for small members and structures due to transport considerations. Also, significant anchorage is needed at the stressing site to accommodate the tremendous stressing forces.

SUMMARY OF THE INVENTION

The present invention overcomes the aforementioned problems and provides an improved method for installing prestressing elements in building structures. The present method eliminates the need for heavy machinery and construction equipment during installation of the stressing elements and also reduces the amount of time, effort and labor required.

In the inventive method, a conduit or duct is positioned in a structure during construction and the concrete or other material subsequently is formed or poured around it. The tensioning strands can be inserted in the conduit before or after the concrete is poured, but the strands are not stressed until after the concrete is poured and sufficiently set. The tensioning strands are inserted into and pushed through the conduit one by one or in numbers directly from one or several supply reels. A mechanical strand puller or guiding apparatus is positioned between the reel and the conduit in order to pull the strands from the reel and push them through the conduit. If desired, a nose guard is positioned on the end of each strand so that they will more easily pass through the conduit. Each of the strands is pushed through the conduit until it appears at the other end. If desired, a counter and cut-off switch can be installed so that when the required length of strand has been pushed through the conduit and recorded on the counter, the cut-off switch will be automatically operated to stop the operation. Once the strand is passed through the conduit, it is cut and the procedure is repeated for other strands until the conduit has the requisite amount of material therein. Subsequently, the bundle of strands is placed under tension and the whole structure is stressed.

In another embodiment of the invention, the method can be used to insert a bundle of strands in a flexible conduit and thus be used as a part of the above described "turn-table" method.

BRIEF DESCRIPTION OF THE DRAWINGS

The invention may be more effectively understood by referring to the accompanying drawings, wherein.

DESCRIPTION OF THE PREFERRED EMBODIMENTS

Figure 1:
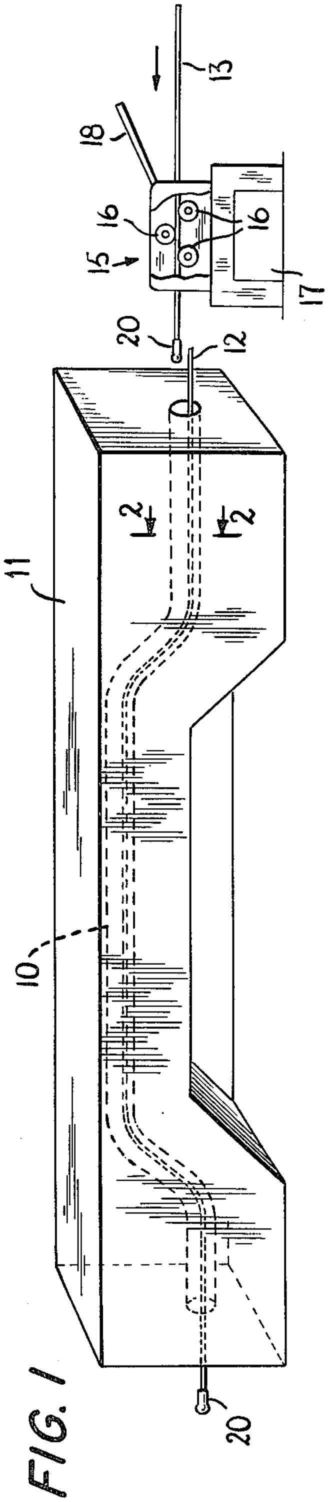
FIG. 1 illustrates the apparatus used for conducting the strands through a conduit.

FIG. 1 illustrates the apparatus used for conducting the present invention. A conduit or duct 10 is positioned in a structure 11. The conduit 10 preferably is a relatively thin walled metal pipe and can be of any diameter. The structure 11 is typically concrete or any other material used for construction purposes. The structure 11 is formed at the building site by the use of appropriate molds or forms. The conduit 10 is positioned by supporting structures in the mold or form before the concrete or other material is poured into it. The concrete is allowed to harden forming the structure 11. A plurality of strands, wires or tendons are inserted through the conduit either before or after the concrete is poured. In FIG. 1, one strand 12 is shown in the conduit. A second strand 13 is shown in position for insertion into the conduit 10. The arrows along the strand 13 show the direction in which it will be inserted.

Figure 2:
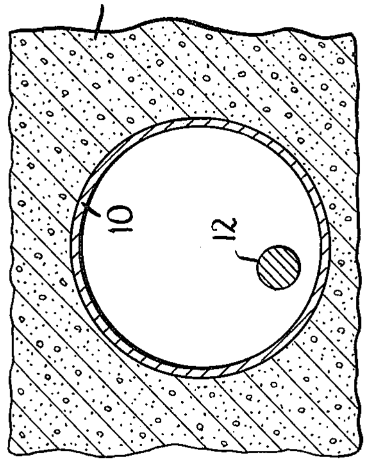
FIG. 2 is a view along lines 2—2 of FIG. 1.

FIG. 2 shows a cross section of the conduit 10 and the structure 11 showing the strand 12 positioned therein.

Figure 5A:
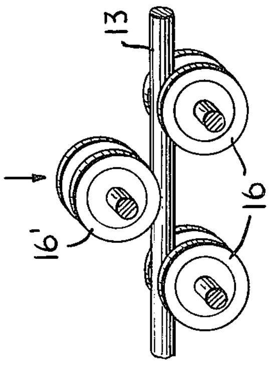
FIGS. 5A and 5B illustrate strand pusher apparatus utilizing plurality of pulleys.
Figure 5B:
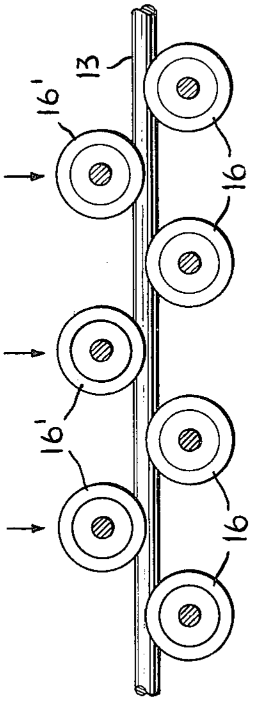

The strands or tendons are usually steel and consist of small wires or rods braided or twisted together and usually are on the order of one-quarter inch or greater in diameter. The plurality of strands are inserted through the conduit 10 by means of a mechanical strand pusher 15. The strand pusher 15 has one or more sets of wheels, pulleys, wedges or the like for positive and frictional engagement with the strands in order to grasp the strands, pull them from the supply reel and push them through the conduit. In FIGS. 1, 5A and 5B, the strand pusher 15 has a plurality of pulleys or other guiding means 16 and a motor 17 which drives the pulleys 16. The motor can be of any conventional type, such as a gasoline or electric motor. One or more of the pulleys are adjustable. Lever 18 is attached to the movable pulley (or pulleys) and is adapted to be mechanically adjusted so that the movable pulley (or pulleys) can be forced onto the strand thereby causing the strand to be pulled from the supply reel through the strand pusher 15.

A series of three pulleys is shown in FIG. 5A and a series of seven pulleys is shown in FIG. 5B. In each embodiment, one or more pulleys 16' is adjustable. The arrow next to pulley 16' in FIG. 5A shows the direction in which it is adjustable and is displaced. The strand 13 is moved through the strand pusher when the pulleys 16' engage it.

It is also possible that the movable pulleys 16' can be spring biased or counterweighted so that they will automatically engage the strand 13 as soon as it is inserted in the strand pusher 15.

Figure 4:
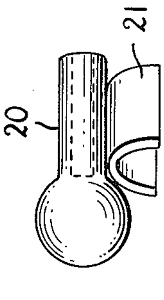
FIG. 4 illustrates a nose guard for placement on the end of the strands.

A reel or other supply means for the strands (not shown) is positioned next to the strand pusher 15 and the strands can be taken directly from that supply reel and inserted through the strand pusher. To ensure that the strands pass freely through the conduit 10, a nose guard 20 can be positioned on the end of each strand. The guard 20 which has a rounded tip or cap is shown in more detail in FIG. 4. Preferably the guard 20 is made of steel or material of similar strength and hardness. The guard 20 is inserted on the end of the strand and does not have to be rigidly or permanently fastened to it.

It is also possible to adapt the rounded guard 20 to ensure that none of the cables get woven around together when they are being inserted through the conduit 10. Such weaving can happen particularly where the conduit is not straight, such as shown in FIG. 1. In this instance, guide means 21 is attached to guard 20 and is formed to be positioned over another strand already inserted through the conduit, such as strand 12. In this manner, the succeeding strand, such as strand 13, will ride and be guided along the strand already positioned in the conduit.

The strand 13 is pushed by apparatus 15 through the conduit until it exits from the other end. A counter (not shown) can be attached to the strand to indicate when the required length of strand has been inserted in the conduit. The counter can also be equipped with a cutoff switch so that the strand pusher 15 will automatically stop once the counter has reached the set amount.

Once the strand 13 is pushed through the conduit 10, it is cut and the process is repeated again and again with other strands until the requisite number of strands are positioned in the conduit.

Figure 3:
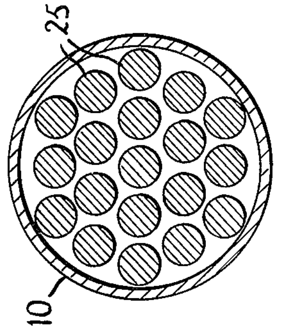
FIG. 3 is a cross section of a conduit after a bundle of strands is inserted therein.

FIG. 3 shows a conduit 10 filled with the required number of strands 25 for the particular construction project. When the conduit 10 is on the order of four to six inches in diameter, approximately 15 to 20 strands 25 are usually needed to fill the tube and provide the necessary material required by the building specifications. It is understood, however, that the precise number of strands varies from job to job depending on the size of the conduit, the size of the strands and the application for which the tensioning is needed.

Once the requisite number of strands are positioned in the conduit 10, appropriate tensioning means (not shown) are attached to each end of the bundle of cables and the cables are placed under tension. Means for post-tensioning structures are well known in the art, such as, the use of the center-pull and shoulder-pull methods using wedge anchors, and nut and thread anchors, threaded plate anchors and the like, as stressing anchors.

Figure 6:
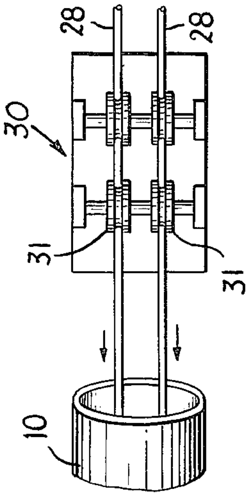
FIG. 6 illustrates a strand pusher with a plurality of sets of pulley means.

It is also possible to insert a plurality of strands 28 in the conduit at the same time, as shown in FIG. 6. A strand pusher 30 with a number of sets of pulleys 31 is positioned between the conduit 10 and a plurality of strand supply reels (not shown). Simultaneously, a strand is pulled from each of the reels and inserted by the strand pusher 30 into the conduit.

The invention has been described with respect to particular embodiments, but it is understood that numerous modifications and changes may occur to those skilled in the art. Any such modifications and changes are included within the scope of the invention as defined by the following claims.

I claim:

1. A method of inserting reinforcing strands into a conduit extending through a structure to be stressed and then placing the strands under tension in the conduit, comprising selectively pushing a plurality of separate strands one-by-one through the conduit forming a group of strands of variable number therein, whereby the number of strands pushed through the conduit may be varied from job to job depending on the amount of reinforcing material required to adequately stress the structure, tensioning the group of strands, and anchoring the group of strands to the structure in order to maintain the group of strands under tension.

2. The process of claim 1 wherein a guard means is positioned on each of the strands prior to being pushed through the conduit.

3. The process of claim 1 wherein the strands are pushed through the conduit by means of a mechanical strand pusher.

4. The process of claim 3 wherein the mechanical strand pusher has a plurality of pulley means being adjustable for engagement with each of the strands.

5. A method of inserting reinforcing strands into a conduit extending through a structure to be stressed and then placing the strands under tension in the conduit, comprising selectively pushing a plurality of separate strands simultaneously through the conduit forming a group of strands of variable number therein, whereby the number of strands pushed through the conduit may be varied from job to job depending on the amount of reinforcing material required to adequately stress the structure, tensioning the plurality of strands, and anchoring the group of strands to the structure in order to maintain the plurality of strands under tension.

6. The process of claim 1 wherein the strands are continuously pushed through the conduit.

7. The process of claim 1 further comprising the step of guiding succeeding strands, as the succeeding strands are pushed through the conduit, along a strand already inserted through the conduit to prevent weaving of the strands.

8. The process of claim 1 further comprising the step of automatically terminating the pushing of the strands as the strands exit from the conduit.

9. The process of claim 5 wherein the strands are continuously pushed through the conduit.

10. The process of claim 5 further comprising the step of automatically terminating the pushing of the strands as the strands exit from the conduit.

* * * * *